United States Patent [19]
Hammer

[11] Patent Number: 6,157,134
[45] Date of Patent: Dec. 5, 2000

[54] LEAD WIRES FOR IMPROVED STARTING OF COMPACT FLUORESCENT LAMP SYSTEMS

[75] Inventor: Edward E. Hammer, Mayfield Village, Ohio

[73] Assignee: General Electric Company, Schenectady, N.Y.

[21] Appl. No.: 09/265,198

[22] Filed: Mar. 10, 1999

[51] Int. Cl.[7] ...................................................... H01J 7/44
[52] U.S. Cl. .............................. 315/56; 315/58; 313/622
[58] Field of Search ................................... 315/56, 58, 59, 315/60, 89, DIG. 1, DIG. 2, DIG. 4, 71; 313/243, 245, 306, 622

[56] References Cited

U.S. PATENT DOCUMENTS

| | | | |
|---|---|---|---|
| 4,316,121 | 2/1982 | Hammer et al. | 315/58 |
| 4,337,414 | 6/1982 | Young | 315/56 |
| 4,348,612 | 9/1982 | Morton | 315/58 |
| 4,450,510 | 5/1984 | Nilssen | 362/221 |
| 5,146,135 | 9/1992 | Lagushenko | 313/619 |
| 5,455,484 | 10/1995 | Maya et al. | 315/56 |
| 5,506,474 | 4/1996 | Hammer et al. | 315/56 |
| 5,627,433 | 5/1997 | Fulop et al. | 315/56 |
| 5,821,699 | 10/1998 | Moisin | 315/DIG. 4 |
| 5,841,229 | 11/1998 | Borowiec et al. | 313/490 |
| 6,051,930 | 4/2000 | Hammer et al. | 315/58 |

*Primary Examiner*—Don Wong
*Assistant Examiner*—Thuy Vinh Tran
*Attorney, Agent, or Firm*—Fay, Sharpe, Fagan, Minnich & Mckee, LLP

[57] ABSTRACT

A sealed lamp unit for a fluorescent lamp system includes first and second lamp electrodes located at respective end points of the sealed lamp unit. The lamp electrodes extend into the sealed lamp unit. A first lead wire extends into the sealed lamp unit. A first extended wire connection has a first end electrically connected to the first lamp electrode and a second end electrically connected to the first lead wire. A first capacitive impedance, electrically connected in series between the first and second ends of the first extended wire connection, limits a current flow through the first extended wire connection. A breakdown voltage path within the sealed lamp unit is modified as a function of a position of the first lead wire.

19 Claims, 3 Drawing Sheets

LEAD WIRES FOR IMPROVED STARTING OF COMPACT FLUORESCENT LAMP SYSTEMS

BACKGROUND OF THE INVENTION

The present invention relates to compact fluorescent lamp systems. It finds particular application in conjunction with starting compact fluorescent lamp systems having high frequency electronic ballast units and will be described with particular reference thereto. It will be appreciated, however, that the invention will also find application in starting other lamp systems.

Many compact fluorescent lamp systems include a sealed, gas-filled lamp having multiple fingers. A gas filling of Argon at approximately 3 Torr coupled with a sufficient quantity of mercury, for example, is commonly used. An inner wall of the lamp is coated with a material (e.g., a mixture of phosphors) which fluoresces when it is bombarded by ultraviolet radiation generated when the mercury within the lamp is ionized.

The fingers of a compact fluorescent lamp are typically formed from several U-shaped tubes. Bridges (i.e., passageways) connect all but two (2) ends of adjacent tubes, thereby forming a lamp having a hexagonal or octagonal geometry. Lamp electrodes are sealed into the unconnected adjacent ends. Each lamp electrode provides an electrical path into the lamp. Conducting electrodes from a high-frequency ballast unit are secured to the lamp electrodes.

When a starting voltage is delivered from the ballast unit to the conducting electrodes, that voltage is transferred to the interior of the lamp via the lamp electrodes. The starting voltage creates electromagnetic fields within the lamp which create a breakdown voltage path and a current within the tubes. The voltage potential within the tubes breaks-down (i.e., ionizes) the inert gas and mercury. Once the mercury atoms are ionized, and a threshold number of ions are produced, the lamp will start and the coating material within the lamp begins to fluoresce.

In its initial state, the inert gas within the lamp presents a high impedance to the ballast. Therefore, the starting voltage supplied by the ballast must be high enough to overcome this impedance and create an ionized gas capable of supplying the necessary current to operate the lamp. Supplying a starting voltage capable of ionizing enough gas to start the lamp, however, can produce an undesirable side-effect. More specifically, if the two (2) lamp electrodes are in close proximity to one another, a higher starting voltage may be necessary due to a capacitive breakdown path between the tubes including the lamp electrodes. When this occurs, not enough discharge current travels within the lamp tubes to start the lamp. These capacitive breakdown paths between the lamp electrodes most often occur when high frequency (e.g., greater than 20 kHz) electronic ballast units are used to control the power supplied to the lamp.

One way to start the compact fluorescent lamp when capacitive displacement current exists between the lamp electrodes is to increase the starting voltage delivered by the ballast unit. Although the displacement current created by the increased starting voltage still exists between the lamp electrodes, more discharge current travels through the lamp tube, thereby permitting the ionized gas to start the lamp. Supplying higher starting voltages to the lamp assembly, however, is undesirable for various reasons. For example, these higher voltages may cause additional voltage stresses on the ballast components which, in turn, require more expensive components to withstand these higher starting voltage requirements.

The present invention provides a new and improved apparatus and method which overcomes the above-referenced problems and others.

SUMMARY OF THE INVENTION

A starting circuit for a fluorescent lamp system includes a ballast unit for controlling electrical power received from an external power source, and a sealed lamp unit, including at least one gas, secured to the ballast unit. The first and second lamp electrodes are located at respective end points of the lamp unit. The lamp electrodes extend into the sealed lamp unit and are electrically connected to the ballast unit. A first lead wire extends into the sealed lamp unit. A first extended wire connection has a first end electrically connected to the first lamp electrode and a second end electrically connected to the first lead wire. A first capacitor, electrically connected in series between the first and second ends of the first extended wire connection, limits a current flow through the first extended wire connection. A breakdown voltage path within the sealed lamp unit is modified as a function of a position of the first lead wire.

In accordance with one aspect of the invention, the at least one gas includes an inert gas and the sealed lamp unit also includes a quantity of mercury.

In accordance with another aspect of the invention, the sealed lamp unit is multi-segmented and the sealed lamp unit is substantially circular.

In accordance with a more limited aspect of the invention, the two (2) lamp electrodes are located in adjacent segments.

In accordance with an even more limited aspect of the invention, the sealed lamp includes eight segments.

In accordance with another aspect of the invention, one of the segments includes an amalgam ball pellet. The first lead wire extends into the segment including the amalgam ball pellet.

In accordance with another aspect of the invention, a second lead wire extends into the sealed lamp unit. A breakdown voltage path within the sealed lamp unit is modified as a function of a position of the first and second lead wires. A second extended wire connection has a first end electrically connected to the second lamp electrode and a second end electrically connected to the second lead wire. A second capacitor, electrically connected in series between the first and second ends of the second extended wire connection, limits a current flow through the second extended wire connection.

In accordance with another aspect of the invention, the two (2) ends of the first and second extended wire connections are located on segments which are separated by approximately one-half of a distance along the voltage breakdown path within the sealed lamp unit.

In accordance with a more limited aspect of the invention, the sealed lamp unit includes eight segments.

One advantage of the present invention is that the breakdown voltage potential is distributed more evenly across the lamp, thereby reducing the voltage requirement to actually start the lamp.

Another advantage of the present invention is that a lower voltage is required to start the fluorescent lamp system.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

DETAILED DESCRIPTION OF THE PREFERRED EMBODIMENTS

Figure 1:
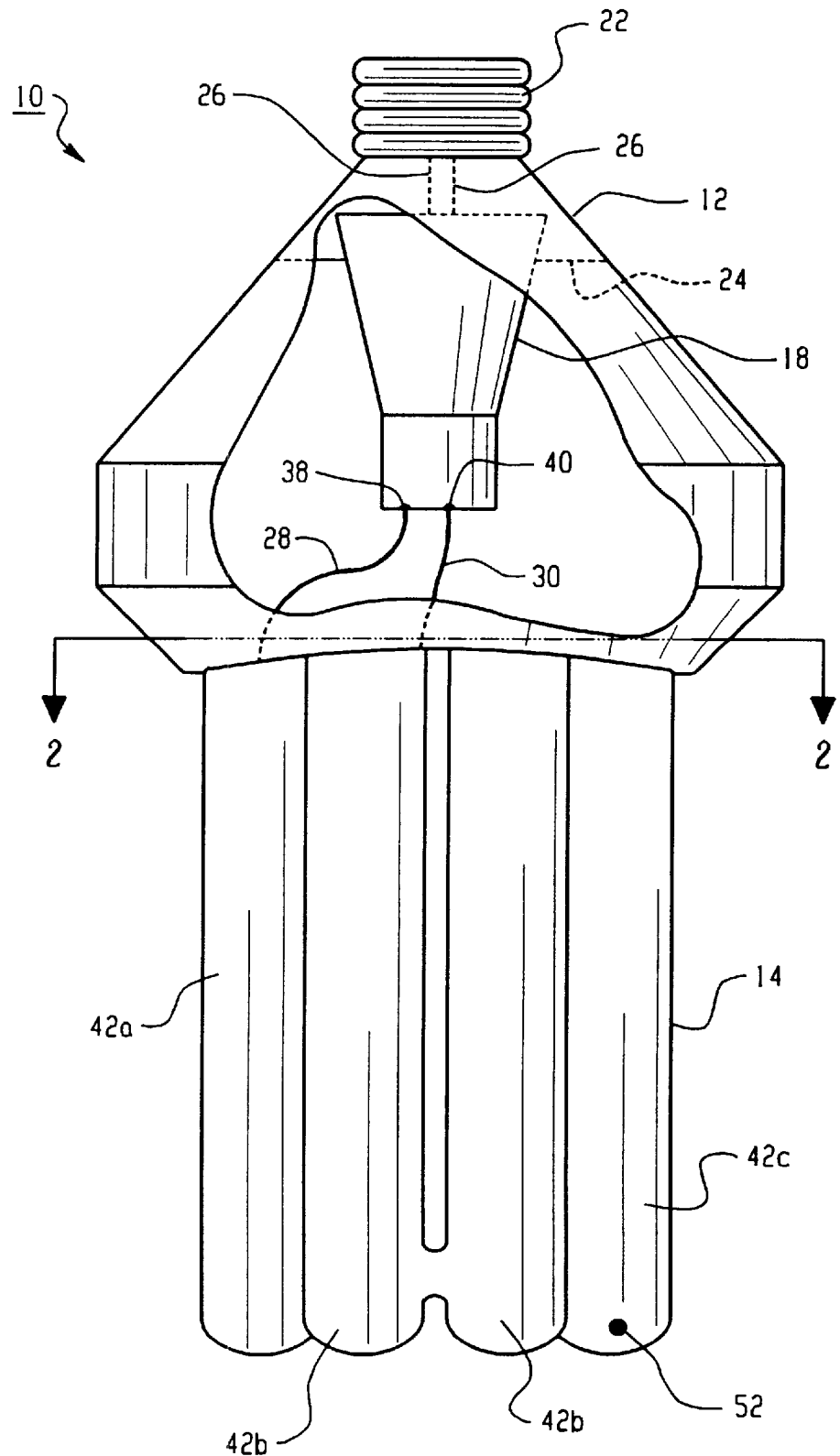
FIG. 1 illustrates a front view of an integral compact fluorescent lamp system according to the present invention.

FIG. 1 illustrates an integral compact fluorescent lamp system 10. The compact fluorescent lamp system 10 includes a housing 12 and an integral type lamp assembly 14. The housing 12 includes a ballast unit 18 and a connection base 22. Fasteners 24 secure the ballast unit 18 to the housing 12. Preferably, the ballast unit 18 is a high-frequency, electronic ballast unit and the fasteners 24 include plastic segments which protrude from the walls of the housing 12 and attach to the ballast unit 18. However, it is to be understood that other ballast units and other types of fasteners are also contemplated. The connection base 22 is preferably an Edison base as used in threaded incandescent sockets. However, it is also contemplated that the connection base be a pin base, as used in a linear fluorescent lamp, or a bayonet-type base. Electrically conductive wires 26 provide an electrical connection between the connection base 22 and the ballast unit 18.

Figure 2:
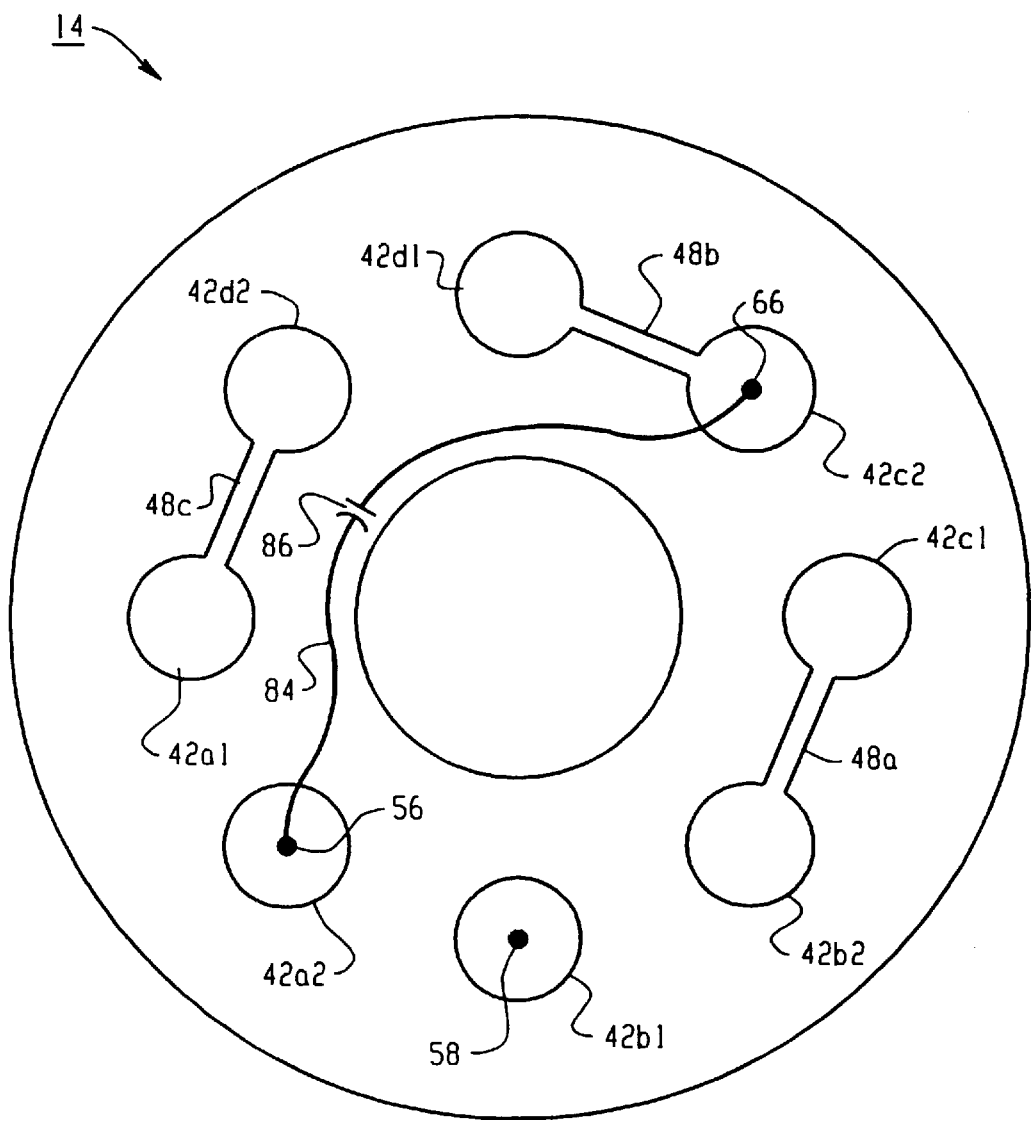
FIG. 2 illustrates a cross-sectional bottom view of the integral compact fluorescent lamp assembly taken along the line indicated in FIG. 1.

With reference to FIGS. 1 and 2, the lamp assembly 14 is electrically connected to the ballast unit 18 through first and second electrical connectors 28, 30, respectively, in the housing 12. More specifically, the first electrical connector 28 connects a first electrode 38 of the ballast unit 18 to the lamp assembly 14. Similarly, the second electrical connector 30 connects a second electrode 40 of the ballast unit 18 to the lamp assembly 14.

The lamp assembly 14 in the preferred embodiment includes four lamp tubes 42a, 42b, 42c, 42d. Each tube 42a, 42b, 42c, 42d is preferably bent into a U-shape. However, other embodiments having different numbers of tubes and/or tubes configured into different shapes are also contemplated. The lamp tube 42a includes tube ends 42a1, 42a2. Similarly, the lamp tubes 42b, 42c, 42d include tube ends 42b1, 42b2; 42c1, 42c2; and 42d1, 42d2, respectively.

The adjacent ends 42b2, 42c1; 42c2, 42d1; and 42d2, 42a1 of the lamp tubes 42a, 42b, 42c, 42d are connected by bridges (i.e., passageways) 48a, 48b, 48c, respectively. More specifically, a bridge (i.e., passageway) 48a connects the adjacent ends 42b2, 42c1 of lamp tubes 42b, 42c, respectively. Similarly, a bridge 48b connects the adjacent ends 42c2, 42d1 of lamp tubes 42c, 42d, respectively, and a bridge 48c connects the adjacent ends 42d2, 42a1 of lamp tubes 42d, 42a, respectively. The adjacent tube ends 42a2, 42b1, which are not connected by a bridge, are sealed. One of the tubes 42c optionally includes an amalgam ball pellet 52.

A first lamp electrode 56 extends into the tube 42a through the sealed end 42a2. A second lamp electrode 58 extends into the tube 42b through the sealed end 42b1. Although it is not illustrated, it is to be understood that each of the lamp electrodes 56, 58 preferably includes a tungsten filament within an emission mix. A first lead wire 66 extends into the tube end 42c2 through the bridge 48b. If one of the tubes 42a, 42b, 42c, 42d includes the amalgam ball pellet 52, it is preferable to insert the lead wire 66 into the tube including the pellet 52. Furthermore, it is preferable that the pellet 52 be approximately one-half of the distance along the path within the lamp assembly 14. While the pellet 52 and/or the lead wire 66 may be included in a tube that is not approximately one-half of the distance along the path within the lamp assembly 14, such configurations would produce less optimal results.

The first lamp electrode 56 is electrically connected to the first ballast electrode 38 through the first electrical connector 28. Similarly, the second lamp electrode 58 is electrically connected to the second ballast electrode 40 through the second electrical connector 30.

Respective ends of a first extended wire connection 84 are electrically connected to the first lamp electrode 56 and the first lead wire 66. A capacitor 86 is electrically connected in series along the first extended wire connection 84. The capacitor 86 acts as a capacitive impedance for limiting the current through the first extended wire connection 84 to less than approximately one (1) milliampere. It is noted that the tube end 42c, which includes the first lead wire 66, is approximately one-half of the distance between the first and second lamp electrodes 56, 58 along the path within the lamp assembly 14.

An inert gas (e.g., Argon) with a sufficient quantity of mercury is included within the sealed tubes 42a, 42b, 42c, 42d and bridges 48a, 48b, 48c. Also, the inner wall of each tube 42a, 42b, 42c, 42d is coated with a material (e.g., a mixture of phosphors), which fluoresces when it is excited with ultra-violet radiation produced when the mercury atoms within the lamp assembly 14 are ionized.

During use, electrical power enters the compact fluorescent lamp system 10 through the connection base 22 and is passed to the ballast unit 18 through the wires 26. The ballast unit 18 controls the electrical power received from the connection base 22. The first and second ballast electrodes 38, 40, respectively, deliver the controlled electrical power to the first and second lamp electrodes 56, 58, respectively, via the first and second electrical connectors 28, 30, respectively.

Once electrical power is supplied to the lamp electrodes 56, 58, a voltage potential is created between the first and second lamp electrodes 56, 58, respectively. The first extended wire connection 84 creates a voltage potential of approximately zero (0) volts between the first lamp electrode 56 and the first lead wire 66. Consequently, a voltage potential is also created between the first lead wire 66 and the second lamp electrode 58. The voltage potential between the lamp electrodes 56, 58 causes electrical fields to be created near the lamp electrodes 56, 58 within the lamp assembly 14. The voltage potential between the first lead wire 66 and the second lamp electrode 58 causes electrical fields to be created near the first lead wire 66 within the lamp assembly 14. It is to be understood that a breakdown path of the electrical fields is modified as a function of the position of the first lead wire 66.

The electrical fields allow current to flow within the tubes 42a, 42b, 42c, 42d and the passages 48a, 48b, 48c for breaking-down (i.e., ionizing) the inert gas. Current flows freely through the entire lamp assembly 14, and the lamp starts, only after a threshold amount of the inert gas breaks-down (i.e., ionizes). After the lamp assembly 14 starts, current continues to flow freely between the first and second lamp electrodes 56, 58 via the tubes 42a, 42b, 42c, 42d and passages 48a, 48b, 48c. The first extended wire connection 84 provides an alternate path for a small amount of the current to flow between the first lamp electrode 56 and the first lead wire 66. More specifically, the capacitor 86 limits the current flowing between the first lamp electrode 56 and the first lead wire 66 via the first extended wire connection 84 to less than about one (1) milliampere.

After electrical power is applied, but before the lamp assembly 14 starts (i.e., when the power is initially supplied to the lamp electrodes 56, 58), the inert gas and mercury vapor within the tubes 42a, 42b, 42c, 42d and passages 48a, 48b, 48c presents a high impedance to current created by electrical fields within the lamp assembly 14.

It is well known that current flows along a path of least resistance. Therefore, before the lamp assembly 14 starts, the voltage potential between the first lead wire 66 and the second lamp electrode 58 causes the inert gas within the tubes 42c, 42b and the passage 48a to begin to ionize. Once a threshold amount of the inert gas within the tubes 42c, 42b and the passage 48a is ionized, a first segment of the lamp assembly 14 including the tubes 42c, 42b and the passage 48a "starts" (i.e., the current flows freely through the lamp tubes 42c, 42b and the passage 48a).

After the first segment of the lamp assembly 14 starts, the current flowing through the lamp tubes 42c, 42b and the passage 48a tends to flow from the first lead wire 66 to the first lamp electrode 56. Because the capacitor 86 limits the current flowing along the first extended wire connection 84 to less than about one (1) milliampere, the current is forced to flow between the first lead wire 66 and the first lamp electrode 56 via a second segment of the lamp assembly 14, which includes the lamp tubes 42a, 42d and the passages 48b, 48c. Once a threshold amount of the inert gas within the tubes 42a, 42d and the passages 48b, 48c is ionized, the second segment of the lamp assembly 14 starts (i.e., the current flows freely through the lamp tubes 42a, 42d and the passages 48b, 48c).

As described above, the first extended wire connection 84 acts to distribute the voltage supplied by the ballast unit 18 more evenly along the breakdown path within the tubes 42a, 42b, 42c, 42d. Therefore, the voltage potential between the first and second lamp electrodes 56, 58, respectively, is extended to an additional point within the discharge space. In fact, the voltage potential between the lamp electrodes 56, 58 is reduced such that the probability of the displacement current shorting between the electrodes 56, 58, even when the ballast unit 18 delivers a starting voltage of about 500 V rms, is greatly reduced. At this point, the capacitive coupling between the lamp electrodes 56, 58 does not occur despite the fact that the electrodes 56, 58 are located in close proximity to one another. Because the displacement current shorts do not occur between the electrodes 56, 58, the lamp tubes 42a, 42b, 42c have a lower starting voltage requirement. Therefore, a sufficient amount of current is delivered along the path inside the tubes 42a, 42b, 42c to start the lamp assembly 14.

Figure 3:
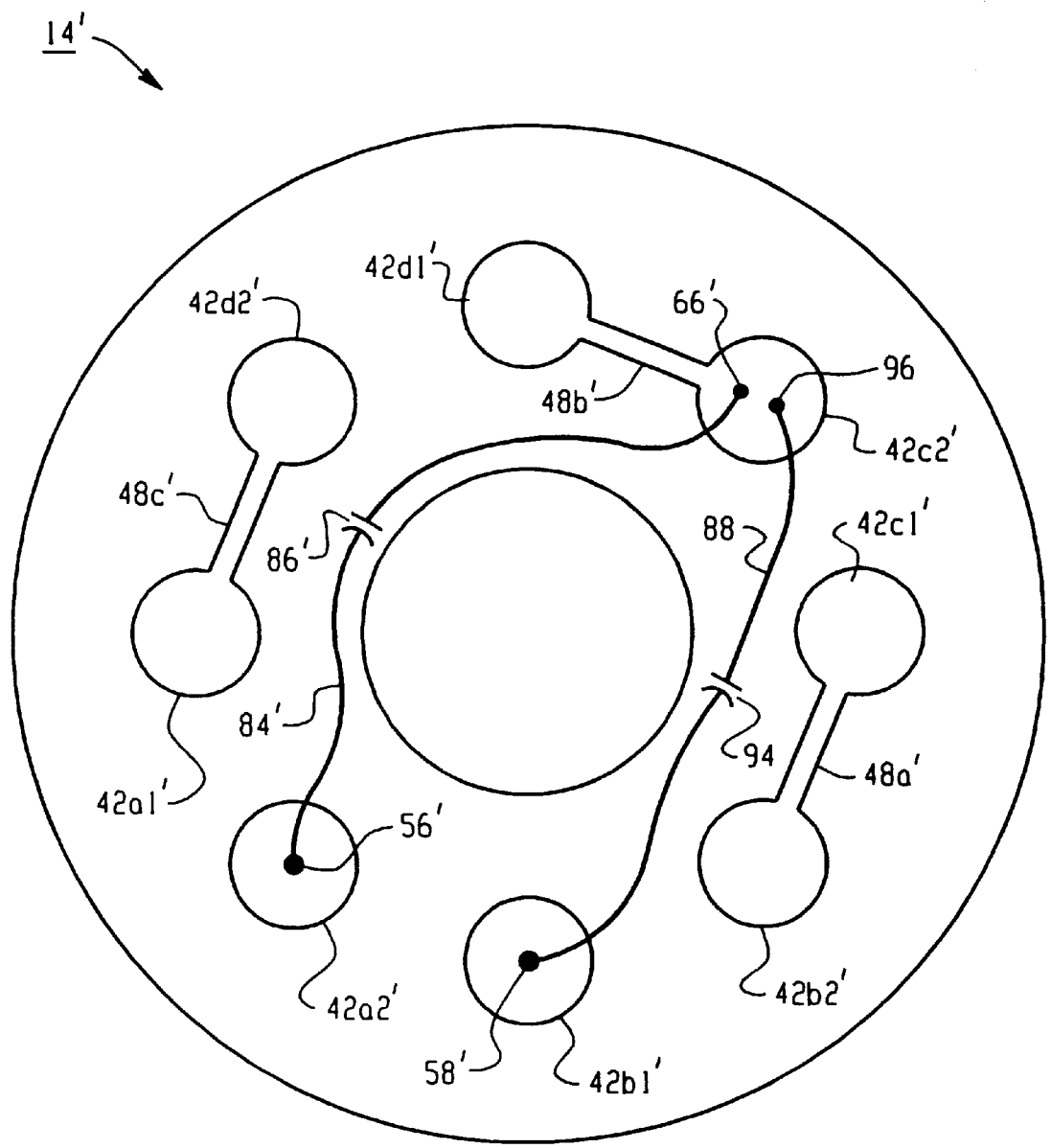
FIG. 3 illustrates a cross-sectional bottom view of the integral compact fluorescent lamp assembly in a second embodiment of the invention.

FIG. 3 illustrates a lamp assembly in a second embodiment of the present invention. For ease of understanding this embodiment, like components are designated by like numerals with a primed (') suffix and new components are designated by new numerals. FIG. 3 illustrates, in addition to a first extended wire connection 84' including a first capacitor 86' electrically connected between a first lamp electrode 56' and a first lead wire 66', a second extended wire connection 88 including a second capacitor 94 is electrically connected between the second lamp electrode 58' and a second lead wire 96.

As in the first embodiment, the first capacitor 86' acts as a capacitive impedance for limiting current through the first extended wire connection 84' to less than approximately one (1) milliampere. Similarly, the second capacitor 94 acts as a capacitive impedance for limiting current through the second extended wire connection 88 to less than approximately one (1) milliampere. Although very little current flows through either of the extended wire connections 84', 88, the extended wire connections 84', 88 add an additional electrical field point along the path within the lamp assembly 14'. In this manner, the breakdown path of the electrical field is modified.

After electrical power is applied, but before the lamp assembly 14' starts (i.e., when the power is initially supplied to the lamp electrodes 56', 58'), the inert gas within the tubes 42a', 42b', 42c', 42d' and passages 48a', 48b', 48c' presents a high impedance to current created by electrical fields within the lamp assembly 14'. However, because the capacitors 86', 94 permit only less than about one (1) milliampere of current to flow through either of the first or second extended wire connections 84', 88, the current flows through the tubes 42a', 42b', 42c', 42d' and the passages 48a', 48b', 48c' rather than flowing through either the first or second extended wire connection 84', 88. More specifically, the electrical fields created at the first and second lamp electrodes 56', 58' and at the lead wires 66', 96 cause current to flow between the first lamp electrode 56' and the lead wires 66', 96 and also between the second lamp electrode 58' and the lead wires 66', 96.

As discussed above, current flowing through the tubes 42a', 42b', 42c', 42d' and the passages 48a', 48b', 48c' causes the inert gas within the tubes 42a', 42b', 42c', 42d' and the passages 48a', 48b', 48c' to ionize. Once enough of the mercury vapor between the first lamp electrode 56' and the lead wires 66', 96 is ionized, a first portion of the lamp assembly 14', which is between the first lamp electrode 56' and the lead wires 66', 96, starts. Similarly, once enough of the mercury vapor between the second lamp electrode 58' and the lead wires 66', 96 is ionized, a second portion of the lamp assembly 14', which is between the second lamp electrode 58' and the lead wires 66', 96, starts. After both the first and second portions of the lamp assembly 14' start, current flows freely through the entire lamp assembly 14' such that the lamp assembly 14' remains illuminated.

The preferred embodiment discloses the first and second extended wire connections, along with the first and/or second capacitors electrically connected in series along the extended wire connections, utilized within an integral compact fluorescent lamp system. However, it is also contemplated that the first and second extended wire connections, along with the first and/or second capacitors, also be utilized within a plug-in type lamp assembly.

The invention has been described with reference to several embodiments. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. A starting circuit for a fluorescent lamp system, the starting circuit comprising:
   a ballast unit for controlling electrical power received from an external power source;
   a sealed lamp unit secured to the ballast unit, the sealed lamp unit including at least one gas;

first and second lamp electrodes located at respective end points of the lamp unit, the lamp electrodes extending into the sealed lamp unit and being electrically connected to the ballast unit;

a first lead wire extending into the sealed lamp unit;

a first extended wire connection having a first end electrically connected to the first lamp electrode and a second end electrically connected to the first lead wire; and a first capacitor, electrically connected in series between the first and second ends of the first extended wire connection, for limiting a current flow through the first extended wire connection, a breakdown voltage path within the sealed lamp unit being modified as a function of a position of the first lead wire.

2. The starting circuit for a fluorescent lamp system as set forth in claim 1, wherein:

the at least one gas includes an inert gas; and the sealed lamp unit also includes a quantity of a mercury.

3. The starting circuit for a fluorescent lamp system as set forth in claim 1, wherein:

the sealed lamp unit is multi-segmented; and the sealed lamp unit is substantially circular.

4. The starting circuit for a fluorescent lamp system as set forth in claim 3, wherein the two lamp electrodes are located in adjacent segments.

5. The starting circuit for a fluorescent lamp system as set forth in claim 4, wherein the sealed lamp includes eight segments.

6. The starting circuit for a fluorescent lamp system as set forth in claim 3, wherein one of the segments includes an amalgam ball pellet, the first lead wire extending into the segment including the amalgam ball pellet.

7. The starting circuit for a fluorescent lamp system as set forth in claim 3, further including:

a second lead wire extending into the sealed lamp unit, a breakdown voltage path within the sealed lamp unit being modified as a function of a position of the first and second lead wires;

a second extended wire connection having a first end electrically connected to the second lamp electrode and a second end electrically connected to the second lead wire; and a second capacitor, electrically connected in series between the first and second ends of the second extended wire connection, for limiting a current flow through the second extended wire connection.

8. The starting circuit for a fluorescent lamp system as set forth in claim 7, wherein the two ends of the first and second extended wire connections are located on segments which are separated by approximately one-half of a distance along the voltage breakdown path within the sealed lamp unit.

9. The starting circuit for a fluorescent lamp system as set forth in claim 8, wherein the sealed lamp unit includes eight segments.

10. A method for starting a compact fluorescent lamp system including a housing, an external base connector mounted in the housing, for receiving electrical power from an external source, a ballast unit secured within the housing and electrically connected to the external base connector, for controlling the electrical power received from the external source, and a lamp unit, comprising:

receiving the electrical power from the external source into the external base connector;

controlling the electrical power with the ballast unit;

receiving the controlled power from the ballast unit into first and second lamp electrodes extending into the lamp unit;

supplying the controlled power to first lead wire, electrically connected to the first lamp electrode via a first extended wire connection, the first lead wire extending into the lamp unit;

creating electrical fields within the lamp unit from the controlled power, the electrical fields being created at the first and second lamp electrodes and at the first lead wire;

starting a first portion of the lamp unit by passing current between the second lamp electrode and the first lead wire; and starting a second portion of the lamp unit by passing the current between the first lead wire and the first lamp electrode, the current flowing between the first lamp electrode and the second lamp electrode via the entire lamp unit after the first and second portions of the lamp unit have started.

11. The method for starting a compact fluorescent lamp system as set forth in claim 10, wherein a first capacitor is electrically connected in series along the first extended wire connection for permitting a limited current to flow between the first lamp electrode and the first lead wire along the first extended wire connection, and the first portion of the lamp unit includes a segment between the second lamp electrode and the first lead wire, the step of starting the first portion of the lamp unit including:

causing the limited current to flow between the first lamp electrode and the first lead wire via the first extended wire connection, the current also flowing between the first lead wire and the second lamp electrode, at least one gas within the lamp unit between the second lamp electrode and the first lead wire being ionized as the current flows, the first portion of the lamp unit starting after a threshold amount of the at least one gas within the first portion is ionized.

12. The method for starting a compact fluorescent lamp system as set forth in claim 11, wherein the second portion of the lamp unit includes a segment between the first lead wire and the first lamp electrode, the step of starting the second portion of the lamp unit including:

after the first portion of the lamp unit starts, causing a sufficient amount of the current to flow between the first lamp electrode and the second lamp electrode within the lamp unit, the at least one gas within the lamp unit between the first lead wire and the first lamp electrode being ionized as the current flows, the second portion of the lamp unit starting after a threshold amount of the at least one gas within the second portion is ionized.

13. The method for starting a compact fluorescent lamp system as set forth in claim 10, wherein a first capacitive element is electrically connected in series along the first extended wire connection for limiting a first current between the first lamp electrode and the first lead wire along the first extended wire connection, a second capacitive element is electrically connected in series along a second extended wire connection electrically connected between the second lamp electrode and the second lead wire for limiting a second current between the second lamp electrode and the second lead wire, the first portion of the lamp unit includes a segment between the second lamp electrode and the lead wires, and the second portion of the lamp unit includes a segment between the lead wires and the first lamp electrode:

the step of starting the first portion of the lamp unit including:

causing the first current to flow between the first lamp electrode and the first lead wire via the first extended wire connection; and causing the first current to flow between the first lead wire and the second lamp electrode within the lamp unit, at least one gas within the lamp unit between the second lamp electrode and the first lead wire being ionized as the first current flows, the first portion of the lamp unit starting after a threshold amount of the at least one gas within the first portion is ionized; and the step of starting the second portion of the lamp unit including:

causing the second current to flow between the second lead wire and the second lamp electrode via the second extended wire connection; and causing the second current to flow between the second lead wire and the first lamp electrode within the lamp unit, at least one gas within the lamp unit between the second lead wire and the first lamp electrode being ionized as the second current flows, the second portion of the lamp unit starting after a threshold amount of the at least one gas within the second portion is ionized.

14. A sealed lamp unit for a fluorescent lamp system, comprising:

first and second lamp electrodes, located at respective end points of the sealed lamp unit, extending into the sealed lamp unit, the sealed lamp unit including at least one gas which breaks-down when an electrical voltage potential is created within the sealed lamp unit, the sealed lamp unit being coated with a material which fluoresces when the at least one gas within the sealed lamp unit breaks-down;

a first lead wire extending into the sealed lamp unit;

a first extended wire connection having a first end electrically connected to the first lamp electrode and a second end electrically connected to the first lead wire;

a first capacitive impedance, electrically connected in series between the first and second ends of the first extended wire connection, for limiting a current flow through the first extended wire connection, a breakdown voltage path within the sealed lamp unit being modified as a function of a position of the first lead wire.

15. The sealed lamp unit as set forth in claim 14, wherein:

the sealed lamp unit is substantially circular and includes a plurality of segments;

the first and second lamp electrodes are located in first and second segments of the sealed lamp unit, the first and second segments being adjacent to one another; and the first lead wire extends into a third segment of the sealed lamp unit.

16. The sealed lamp unit as set forth in claim 15, wherein the sealed lamp unit includes eight segments.

17. The sealed lamp unit as set forth in claim 15, wherein the first and second segments which are separated by approximately one-half of a distance along the voltage breakdown path within the sealed lamp unit from the third segment.

18. The sealed lamp unit as set forth in claim 15, further including:

an amalgam ball pellet positioned in the third segment of the sealed lamp unit.

19. The sealed lamp unit as set forth in claim 15, further including:

a second lead wire extending into the sealed lamp unit, the first lead wire being positioned relative to the second lead wire for providing a capacitive breakdown path between the lead wires;

a second extended wire connection, having a first end electrically connected to the second lamp electrode and a second end electrically connected to the second lead wire; and a second capacitive impedance, electrically connected in series between the first and second ends of the second extended wire connection, for limiting a current flow through the second extended wire connection, the breakdown voltage path within the sealed lamp unit being modified as a function of a position of the first and second lead wires.

* * * * *